United States Patent
Piirainen

(10) Patent No.: US 7,653,160 B2
(45) Date of Patent: Jan. 26, 2010

(54) METHOD OF ESTIMATING NOISE AND INTERFERENCE COVARIANCE MATRIX, RECEIVER, AND RADIO SYSTEM

(75) Inventor: Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 676 days.

(21) Appl. No.: 11/266,359

(22) Filed: Nov. 4, 2005

(65) Prior Publication Data

US 2006/0291596 A1 Dec. 28, 2006

(30) Foreign Application Priority Data

Jun. 23, 2005 (FI) ................................. 20055347

(51) Int. Cl.
H04L 1/00 (2006.01)
H04L 1/02 (2006.01)
H04L 1/10 (2006.01)
H04L 7/02 (2006.01)
H04J 11/00 (2006.01)

(52) U.S. Cl. ..................... 375/346; 375/347; 375/349; 375/350; 375/260; 375/203; 455/63.1; 455/132

(58) Field of Classification Search ................. 375/267, 375/346, 343, 350; 370/286, 334; 455/63.1, 455/302
See application file for complete search history.

(56) References Cited

U.S. PATENT DOCUMENTS 6,041,424 A * 3/2000 Kurata et al. ................. 714/33

| | | | |
|---|---|---|---|
| 7,373,130 B2* | 5/2008 | Huss | 455/296 |
| 2004/0114695 A1* | 6/2004 | Astely et al. | 375/343 |
| 2004/0139137 A1* | 7/2004 | Mailaender et al. | 708/502 |
| 2005/0101253 A1* | 5/2005 | Pajukoski et al. | 455/63.1 |
| 2005/0101279 A1 | 5/2005 | Lee et al. | |

OTHER PUBLICATIONS

Jorswieck, E.A; Boche, H.; Schubert, M., Analysis of multiuser MIMO systems with MMSE receiver based on worst case noise, Mar. 18-19, 2004, 2004 ITG Workshop on Smart Antennas, pp. 122-129.*

* cited by examiner

*Primary Examiner*—Mohammad H Ghayour
*Assistant Examiner*—Eboni Giles
(74) *Attorney, Agent, or Firm*—Squire, Sanders & Dempsey, L.L.P.

(57) ABSTRACT

The invention relates to a method of estimating a noise and interference covariance matrix and to a receiver. The method comprises: estimating an initial noise and interference covariance matrix on the basis of a received signal; reducing the impact of the background noise of the receiver from the initial noise and interference covariance matrix for obtaining a residual matrix; accepting the obtained residual matrix when the residual matrix is at least approximately positive semidefinite; modifying the obtained residual matrix such that the positive semidefinity of the residual matrix is achieved when the residual matrix is not at least approximately positive semidefinite; and adding the impact of background noise back to the residual matrix for estimating a final noise and interference covariance matrix.

25 Claims, 4 Drawing Sheets

METHOD OF ESTIMATING NOISE AND INTERFERENCE COVARIANCE MATRIX, RECEIVER, AND RADIO SYSTEM

FIELD

The invention relates to a method of estimating a noise and interference covariance matrix in a receiver, to a receiver, to a radio system, to a computer program product encoding a computer process of instructions for executing a computer process for estimating a noise and interference covariance matrix and to a computer program distribution medium.

BACKGROUND

Considerable performance gains have been achieved lately in radio systems by using Interference Rejection Combining (IRC) receivers. The desired signal is impaired by interference. However, when the receiver equipment has two antennas, it is possible to resist interference effectively without increasing the complexity of receivers significantly. Therefore, radio systems may employ different diversity methods to increase the capacity of the system. One of them is spatial diversity, which is obtained using an array antenna comprising a plural number of antenna elements that are physically separate from each other. The received signals are combined in diversity receivers using a suitable combining method.

Current receivers are based on statistical signal models the accuracy of which cannot be relied on in all situations. A known combining method that can reduce the impact of noise and interference is the Maximal Ratio Combining (MRC) method. However, this method supposes that the interference and noise in each antenna element are independent of other antenna elements, i.e. they are white. This is not always true in actual cellular radio networks, in particular. Another known combining method is Interference Rejection Combining (IRC). IRC receivers have a good performance in radio links in which the performance is limited only by interference. The problem of the advanced IRC receivers is the more noise limited cases (sensitivity) and also the cases where there are both noise and interference present. It can be seen that the more advanced IRC receivers are used, the more there is loss in the sensitivity. The IRC receivers trust their operation to the estimated interference covariance matrix, and as it is estimated, it is not perfect. Thus, sensitivity loss compared to reference MRC receivers can be seen.

In typical operating conditions when a terminal device is on the edge of a radio cell, the radio link has a poor signal-to-noise ratio, SNR, and a high probability exists for a radio link, which is interfered by the interference from neighbouring cells. Therefore, the IRC algorithms would be highly beneficial in situations where the SNR is also low.

A typical solution has been to select the receiver algorithm based on estimation whether the case is noise or interference limited. Clearly those kinds of algorithms are not very effective. In U.S. patent application Ser. No. 10/662,826, a "soft switch" algorithm was proposed in which a compromise was made between noise and interference limited cases. The effect of hard selection was reduced but basically this algorithm makes a compromise with the performance of the receiver in different operating scenarios, i.e., it tries to reduce the loss of sensitivity by reducing some receiver performance against interference. When studying the performance of IRC receivers against interference where the two exemplary solutions of IRC algorithms are used, called here Space-Time IRC (STIRC) and Space-Time-Complex Plane IRC (STCIRC), the latter being a further development of STIRC, it can be seen that the solutions behave as compromises in both extreme cases.

Receiver sensitivity is a key performance criterion in network planning. Good base station sensitivity can allow lower mobile station transmission power, thereby reducing overall interference, allowing a longer mobile station battery life, and hence lowering the number of sub-cells in coverage limited rural areas. Therefore, one of the issues in finding a good receiver solution is to obtain an algorithm that maintains the existing sensitivity performance but does not significantly affect the interference performance. As the modelling of the interference is getting more accurate in future receivers, also the losses are getting larger, if the problems related to the receivers are not solved.

BRIEF DESCRIPTION OF THE INVENTION

It is an object of the invention to provide an improved method of estimating a noise and interference covariance matrix, receiver, radio system, computer program product and computer program distribution medium. According to an aspect of the invention, there is provided a method of estimating a noise and interference covariance matrix in a receiver, the method comprising: estimating an initial noise and interference covariance matrix on the basis of a received signal; reducing the impact of the background noise of the receiver from the initial noise and interference covariance matrix for obtaining a residual matrix; accepting the obtained residual matrix when the residual matrix is at least approximately positive semidefinite; modifying the obtained residual matrix such that the positive semidefinity of the residual matrix is achieved when the residual matrix is not at least approximately positive semidefinite; and adding the impact of background noise back to the residual matrix for estimating a final noise and interference covariance matrix.

According to an aspect of the invention, there is also provided a receiver comprising at least one antenna for signal reception, the receiver further comprising: means for estimating an initial noise and interference covariance matrix on the basis of a received signal; means for reducing the impact of the background noise of the receiver from the initial noise and interference covariance matrix for obtaining a residual matrix; means for accepting the obtained residual matrix when the residual matrix is at least approximately positive semidefinite; means for modifying the obtained residual matrix such that the positive semidefinity of the residual matrix is achieved when the residual matrix is not at least approximately positive semidefinite; and means for adding the impact of background noise back to the residual matrix for estimating a final noise and interference covariance matrix.

According to another aspect of the invention, there is also provided a receiver comprising: at least one antenna for signal reception; a calculator for estimating an initial noise and interference covariance matrix on the basis of a received signal; a calculator for reducing the impact of the background noise of the receiver from the initial noise and interference covariance matrix for obtaining a residual matrix; a calculator for accepting the obtained residual matrix when the residual matrix is at least approximately positive semidefinite; a calculator for modifying the obtained residual matrix such that the positive semidefinity of the residual matrix is achieved when the residual matrix is not at least approximately positive semidefinite; and a calculator for adding the impact of background noise back to the residual matrix for estimating a final noise and interference covariance matrix.

According to another aspect of the invention, there is provided a radio system including a network infrastructure and user equipment comprising: a receiver for communicating signals between the network infrastructure and the user equipment. The receiver further comprises: means for estimating an initial noise and interference covariance matrix on the basis of a received signal; means for reducing the impact of the background noise of the receiver from the initial noise and interference covariance matrix for obtaining a residual matrix; means for accepting the obtained residual matrix when the residual matrix is at least approximately positive semidefinite; means for modifying the obtained residual matrix such that the positive semidefinity of the residual matrix is achieved when the residual matrix is not at least approximately positive semidefinite; and means for adding the impact of background noise back to the residual matrix for estimating a final noise and interference covariance matrix.

According to another aspect of the invention, there is provided a radio system including a network infrastructure and user equipment comprising: a receiver for communicating signals between the network infrastructure and the user equipment. The receiver further comprises: a calculator for estimating an initial noise and interference covariance matrix on the basis of a received signal; a calculator for reducing the impact of the background noise of the receiver from the initial noise and interference covariance matrix for obtaining a residual matrix; a calculator for accepting the obtained residual matrix when the residual matrix is at least approximately positive semidefinite; a calculator for modifying the obtained residual matrix such that the positive semidefinity of the residual matrix is achieved when the residual matrix is not at least approximately positive semidefinite; and a calculator for adding the impact of background noise back to the residual matrix for estimating a final noise and interference covariance matrix.

According to another aspect of the invention, there is provided a computer program product encoding a computer process of instructions for executing a computer process for estimating a noise and interference covariance matrix in a radio system. The process includes: estimating an initial noise and interference covariance matrix on the basis of a received signal; reducing the impact of the background noise of the receiver from the initial noise and interference covariance matrix for obtaining a residual matrix; accepting the obtained residual matrix when the residual matrix is at least approximately positive semidefinite; modifying the obtained residual matrix such that the positive semidefinity of the residual matrix is achieved when the residual matrix is not at least approximately positive semidefinite; and adding the impact of background noise back to the residual matrix for estimating a final noise and interference covariance matrix.

According to another aspect of the invention, there is provided a computer program distribution medium readable by a computer and encoding a computer program of instructions for executing a computer process for estimating a noise and interference covariance matrix in a radio system. The process includes: estimating an initial noise and interference covariance matrix on the basis of a received signal; reducing the impact of the background noise of the receiver from the initial noise and interference covariance matrix for obtaining a residual matrix; accepting the obtained residual matrix when the residual matrix is at least approximately positive semidefinite; modifying the obtained residual matrix such that the positive semidefinity of the residual matrix is achieved when the residual matrix is not at least approximately positive semidefinite; and adding the impact of background noise back to the residual matrix for estimating a final noise and interference covariance matrix.

Different embodiments of the invention provide several advantages. Receiver performance is improved in noise and interference limited situations. When considering the receiver performance, significant gains are achieved. New information is brought to the radio system and utilized in a smart and effective way.

LIST OF DRAWINGS

In the following, the invention will be described in greater detail with reference to the preferred embodiments and the accompanying drawings, in which FIG. 1 shows an example of a data transmission system;

DESCRIPTION OF THE EMBODIMENTS

Figure 1:
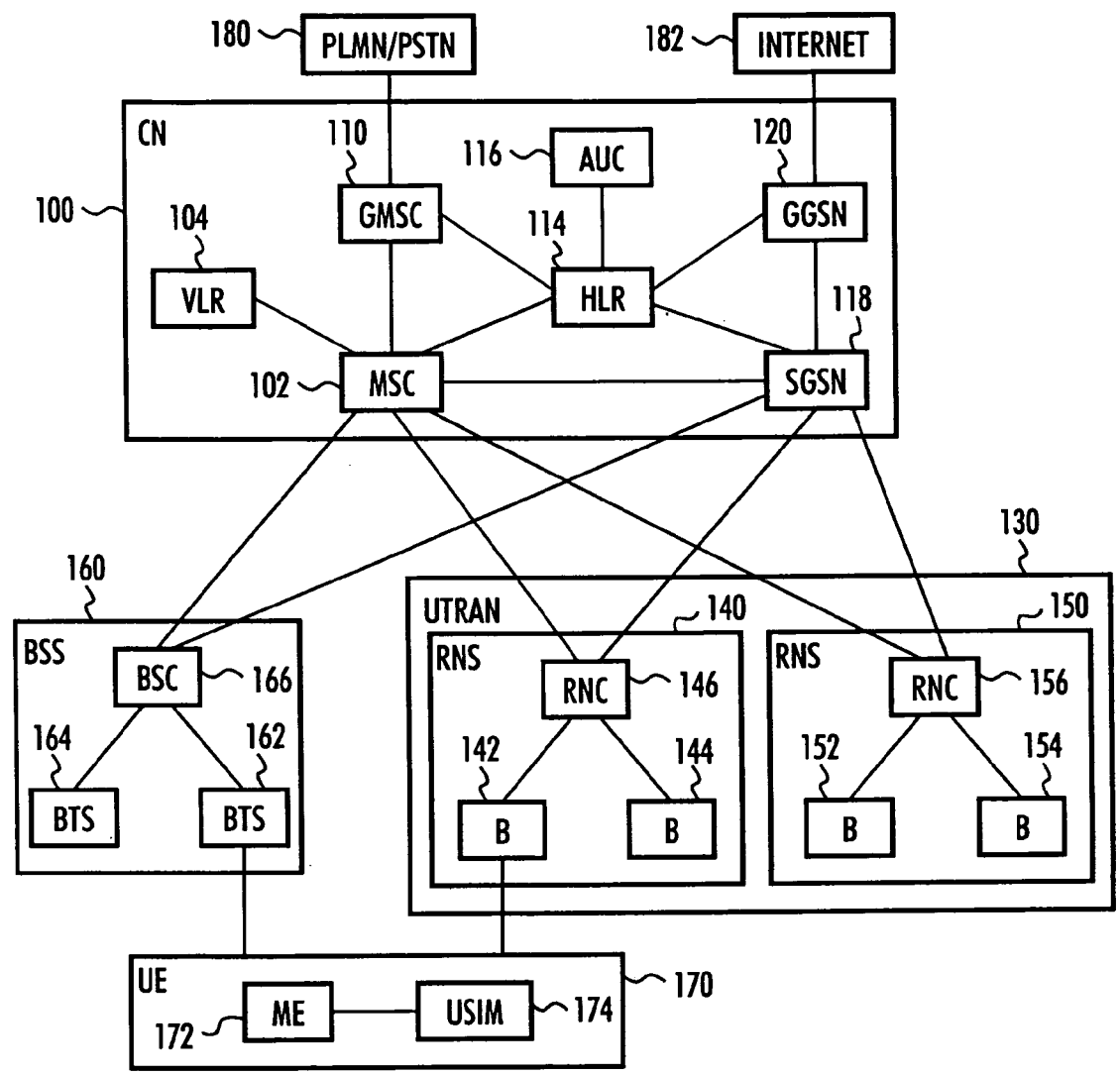

With reference to FIG. 1, examine an example of a data transmission system in which the preferred embodiments of the invention can be applied. FIG. 1 is a simplified block diagram that describes the most important parts of the radio systems on the network element level. The structure and functions of the network elements are not described in detail, because they are commonly known. The described solution may be applied in digital TDMA, FDMA and CDMA radio systems, although it is not restricted to them.

In FIG. 1, a core network CN 100 represents the radioindependent layer of the telecommunications system. The radio systems are shown as a first radio system, i.e. radio access network 130, and a second radio system, i.e. base station system BSS 160. In addition, the figure shows user equipment UE 170. The term UTRAN comes from the words UMTS Terrestrial Radio Access Network, i.e. the radio access network 130 is implemented using wideband code division multiple access WCDMA. The base station system 160 is implemented using time division multiple access TDMA.

Generally, it is also possible to define that a radio system comprises user equipment, also known as a user device or a mobile phone, and a network part that contains the radio access network or base station system of the fixed infrastructure of the radio system.

The structure of the core network 100 corresponds to a combined GSM and GPRS system structure. The GSM network elements are responsible for providing circuit-switched connections and the GPRS network elements are responsible for providing packet-switched connections, some of the network elements being, however, included in both systems.

A mobile services switching centre MSC 102 is the midpoint of the circuit-switched side of the core network 100. One and the same mobile services switching centre 102 can be used to serve the connections of both the radio access network 130 and the base station system 160. The tasks of the mobile services switching centre 102 include switching, paging, location registration, handover management, collecting subscriber billing information, encryption parameter management, frequency allocation management, and echo cancellation. The number of mobile services switching centres 102 may vary: a small network operator may have only one mobile services switching centre 102, but large core networks 100 usually have several.

Large core networks 100 can have a separate gateway mobile services switching centre GMSC 110 that takes care of the circuit-switched connections between the core network 100 and external networks 180. The gateway mobile services switching centre 110 is located between the mobile services switching centres 102 and the external networks 180. An external network 180 can be a public land mobile network PLMN or public switched telephone network PSTN, for instance.

A home location register HLR 114 contains a permanent subscriber register, i.e. the following information, for instance: an international mobile subscriber identity IMSI, mobile subscriber ISDN number MSISDN, authentication key, and when the radio system supports GPRS, a PDP (Packet Data Protocol) address.

A visitor location register VLR 104 contains user equipment 170 roaming information in the area of the mobile services switching centre 102. The visitor location register 104 contains mainly the same information as the home location register 114, but the information is only temporarily in the visitor location register 104.

An authentication centre AuC 116 always resides physically at the same location as the home location register 114 and contains an individual subscriber authentication key Ki, a ciphering key CK and the corresponding IMSI.

The network elements in FIG. 1 are functional entities whose physical implementation may vary. Ordinarily, the mobile services switching centre 102 and visitor location register 104 form one physical device, and the home location register 114 and authentication centre 116 another physical device.

A serving GPRS support node SGSN 118 is the midpoint of the packet-switched side of the core network 100. The main task of SGSN 118 is to transmit packets to and receive them from user equipment 170 supporting packet-switched transmission by using the radio access network 130 or base station system 160. SGSN 118 contains subscriber and location information concerning the user equipment 170.

A gateway GPRS Support Node GGSN 120 is the packet-switched side counterpart to the gateway mobile services switching centre 110 of the circuit-switched side, with the difference, however, that GGSN 120 must also be capable of routing traffic from the core network 100 to external networks 182, whereas GMSC 110 only routes incoming traffic. In our example, the Internet represents the external networks 182.

The first radio system, i.e. radio access network 130, comprises radio network subsystems RNS 140, 150. Each radio network subsystem 140, 150 comprises radio network controllers RNC 146, 156 and Nodes B 142, 144, 152, 154. The Node B is a rather abstract concept, and often the term base station is used instead of it.

The radio network controller 146 controls the Nodes B 142, 144. In principle, the aim is that the devices providing the radio path and the related functions reside in the Nodes B 142, 144 and the control devices reside in the radio network controller 146.

The radio network controller 146 takes care of the following tasks, for instance: radio resource management of the Node B 142, 144, inter-cell handovers, frequency management, i.e. the allocation of frequencies to the Nodes B 142, 144, management of frequency hopping sequences, measurement of time delays on the uplink, provision of the operation and maintenance interface, and power control.

The Node B 142, 144 comprises one or more transceivers, with which the WDCMA radio interface is provided. The Node B serves one cell, but it can also serve several sectored cells. The diameter of a cell may vary from a few meters to dozens of kilometers. The tasks of the Node B 142, 144 include: timing advance calculation, uplink measurements, channel coding, encryption and decryption.

The second radio system, i.e. base station system 160, comprises a base station controller BSC 166 and base stations BTS 162, 164. The base station controller 166 controls the base stations 162, 164. In principle, the aim is that the devices providing the radio path and the related functions reside in the base stations 162, 164 and the control devices reside in the base station controller 166. The base station controller 166 takes care of essentially the same tasks as the radio network controller.

The base station 162, 164 contains at least one transceiver that provides one carrier, i.e. eight time slots, i.e. eight physical channels. Typically, one base station 162, 164 serves one cell, but it can also serve several sectored cells. The base station 162, 164 also comprises a transcoder that converts between the speech coding formats used in the radio system and the public telephone network. However, in practice, the transcoder usually resides physically in the mobile services switching centre 102. The tasks of the base station 162, 164 correspond to those of the Node B.

Both Node B 142, 144 and base station 162, 164 may utilise spatial diversity, i.e. use an array antenna in the signal reception (and also transmission). An antenna array may comprise a plural number of antenna elements that are physically separate from each other. The received signals are combined in diversity receivers using a suitable combining method.

The user equipment 170 comprises two parts: mobile equipment ME 172 and UMTS subscriber identity module USIM 174. The user equipment 170 contains at least one transceiver that provides a radio link to the radio access network 130 or base station system 160. The user equipment 170 may contain at least two different user identity modules. In addition, the user equipment 170 contains an antenna, a user interface and a battery. Currently, there are different types of user equipment 170, those installed in cars and portable equipment, for instance.

USIM 174 contains user-related information and especially information related to information security, such as an encryption algorithm.

Figure 2:
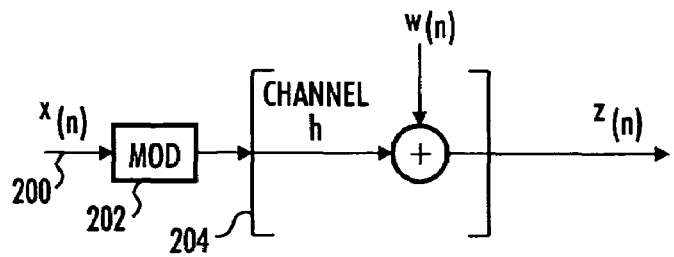
FIG. 2 illustrates a signal model in a non-diversity case.

Let us next examine some theoretical basis of the disclosed solution. A signal model in a single branch case (i.e. no spatial diversity) is illustrated in FIG. 2. Symbols to be transmitted 200 are modulated in a modulator 202 and transmitted through a channel 204 with impulse response h. In the channel, noise w is added to the signal. Received base band signal z is thus $$z(n) = x*h(n) + w(n),$$

where h is channel impulse response and w additive noise. This formula can be rewritten using matrix notation as $$z = Xh + w.$$

Applying this to a spatial diversity case where two antenna branches are used, namely main and diversity branches, and assuming that the received signal is oversampled (two samples per symbol), we get the following:

$(z_{M1}, z_{M2}) (z_{D1}, z_{D2})$ $$z_{M1} = Xh_{M1} + w_{M1} \quad z_{D1} = Xh_{D1} + w_{D1} \quad (1)$$

$$z_{M2} = Xh_{M2} + w_{M2} \quad z_{D2} = Xh_{D1} + w_{D2}$$

where indices M and D indicate the main and diversity branches, and indices 1 and 2 denote a first and a second sample of a symbol, respectively.

Figure 3:
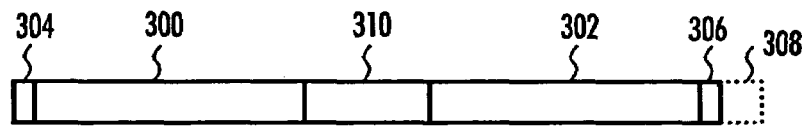
FIG. 3 illustrates a typical burst used in radio systems.

An example of a typical burst used in radio systems is illustrated in FIG. 3. The burst comprises actual encrypted data fields 300, 302, tail symbols 304, 306 at the beginning and the end of the burst, guard period symbols 308 and a training sequence 310, typically in the middle of the burst. Training symbols are known symbols, which are used in channel estimation. Error vectors $e_{M1}$, $e_{M2}$, $e_{D1}$, $e_{D2}$ for each diversity branch and sample can be formed over the training sequence symbols as $$e_M = (e_{M1}, e_{M2}) \quad e_D = (e_{D1}, e_{D2})$$

$$e_{M1} = z_{M1} - Xh_{M1} \quad e_{D1} = z_{D1} - Xh_{D1}, \quad (2)$$

$$e_{M2} = z_{M2} - Xh_{M2} \quad e_{D1} = z_{D2} - Xh_{D2}$$

where z denotes the training sequence symbols.

Here it is assumed that the interference and noise in each antenna element is not dependent on other antenna elements, i.e. they are coloured. The correlation of noise and interference is estimated using covariance matrices.

Next, spatial noise covariance matrices are determined. These matrices are needed for IRC spatial whitening, i.e. removal of correlation in the space domain. The spatial noise co-variance matrices $A_1$ and $A_2$ are determined independently for first and second samples as $$A_1 = \begin{pmatrix} E\{e_{M1}e_{M1}^H\} & E\{e_{M1}e_{D1}^H\} \\ E\{e_{D1}e_{M1}^H\} & E\{e_{D1}e_{D1}^H\} \end{pmatrix} = \begin{pmatrix} \sigma_{M1}^2 & cov_{12} \\ cov_{21} & \sigma_{M2}^2 \end{pmatrix} \quad (3)$$

$$A_2 = \begin{pmatrix} E\{e_{M2}e_{M2}^H\} & E\{e_{M2}e_{D2}^H\} \\ E\{e_{D2}e_{M2}^H\} & E\{e_{D2}e_{D2}^H\} \end{pmatrix} = \begin{pmatrix} \sigma_{M2}^2 & cov_{34} \\ cov_{43} & \sigma_{D2}^2 \end{pmatrix} \quad (4)$$

Here $E\{e_{M1}, e_{M2}\}$ denotes the expectation value of product $e_{M1} e_{M2}$ and $e_{M1}^H$ denotes a Hermitian vector of a complex vector $e_{M1}$. $\sigma_{M1}$ represents noise variance of a respective branch and sample, and $cov_{ij}$ represents the covariance between branches i and j. Although there are only two antenna branches, oversampling creates two additional "branches", thus making the number of branches four.

Next, temporal noise covariance matrices are defined. These matrices are needed for temporal whitening in IRC, i.e. removal of correlation in the time domain. These matrices are computed typically after the spatial whitening. The temporal noise co-variance matrices $C_M$ and $C_D$ are determined independently for main and diversity branches, respectively, as $$C_M = \begin{pmatrix} E\{e_{M1}e_{M1}^H\} & E\{e_{M1}e_{M2}^H\} \\ E\{e_{M2}e_{M1}^H\} & E\{e_{M2}e_{M2}^H\} \end{pmatrix} = \begin{pmatrix} \sigma_{M1}^2 & cov_{13} \\ cov_{31} & \sigma_{M2}^2 \end{pmatrix} \quad (5)$$

$$C_D = \begin{pmatrix} E\{e_{D1}e_{D1}^H\} & E\{e_{D1}e_{D2}^H\} \\ E\{e_{D2}e_{D1}^H\} & E\{e_{D2}e_{D2}^H\} \end{pmatrix} = \begin{pmatrix} \sigma_{D1}^2 & cov_{24} \\ cov_{42} & \sigma_{D2}^2 \end{pmatrix} \quad (6)$$

Only variance and covariance terms for the diversity branch need to be recomputed. The variance and covariance terms for the main branch were already calculated for spatial whitening, and they do not need recomputing because the spatial whitening only affected the diversity branch signal and channel taps.

Next, a spatial and temporal noise covariance matrix is defined. This 4×4 matrix is needed for space-time IRC spatial whitening. It is determined as $$N = \begin{pmatrix} E\{e_{M1}e_{M1}^H\} & E\{e_{M1}e_{D1}^H\} & E\{e_{M1}e_{M2}^H\} & E\{e_{M1}e_{D2}^H\} \\ E\{e_{D1}e_{M1}^H\} & E\{e_{D1}e_{D1}^H\} & E\{e_{D1}e_{M2}^H\} & E\{e_{D1}e_{D2}^H\} \\ E\{e_{M2}e_{M1}^H\} & E\{e_{M2}e_{D1}^H\} & E\{e_{M2}e_{M2}^H\} & E\{e_{M2}e_{D2}^H\} \\ E\{e_{D2}e_{M1}^H\} & E\{e_{D2}e_{D1}^H\} & E\{e_{D2}e_{M2}^H\} & E\{e_{D2}e_{D2}^H\} \end{pmatrix} \quad (7)$$

$$= \begin{pmatrix} \sigma_{11}^2 & cov_{12} & cov_{13} & cov_{14} \\ cov_{21} & \sigma_{22}^2 & cov_{23} & cov_{24} \\ cov_{31} & cov_{32} & \sigma_{33}^2 & cov_{34} \\ cov_{41} & cov_{42} & cov_{43} & \sigma_{44}^2 \end{pmatrix}$$

Figure 4:
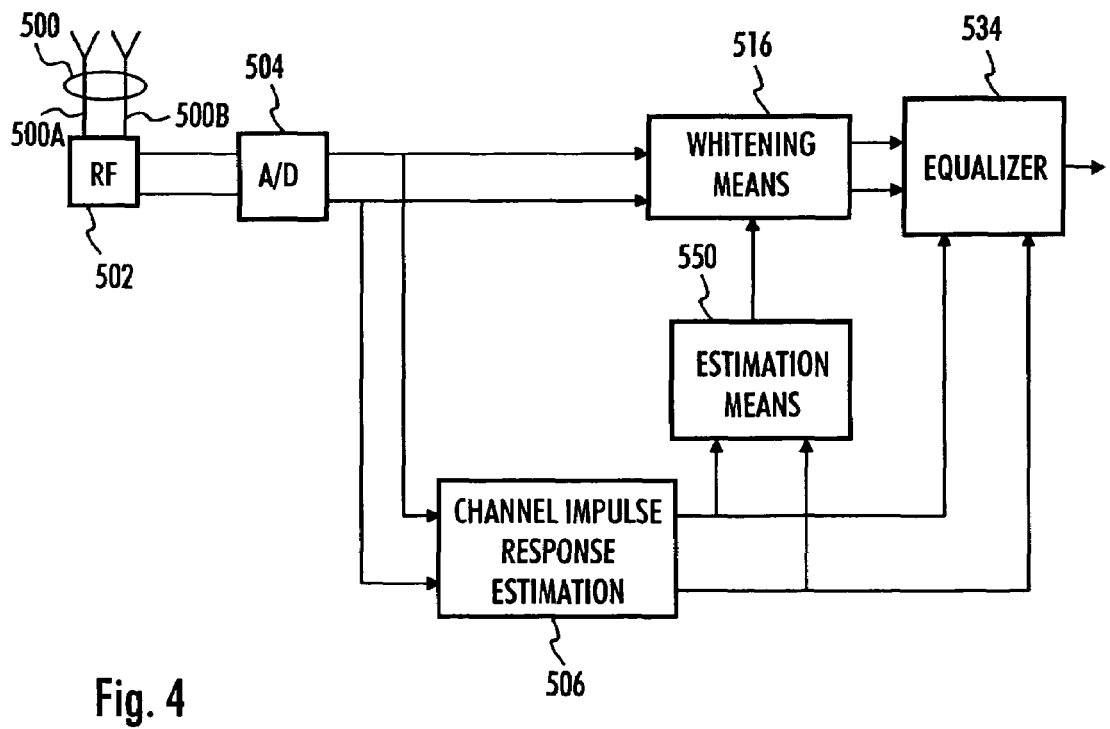
FIG. 4 illustrates an example of a receiver according to an embodiment of the invention.

FIG. 4 illustrates an example of a receiver according to an embodiment of the invention. The receiver comprises signal receiving means, such as an array antenna 500 with two antenna elements 500A, 500B. However, it is also possible to use antennas with only one antenna element. The embodiments can be applied, for example, when processing a single received signal in different time frames. The received signal is processed in the radio frequency (RF) parts 502 of the receiver. In the RF parts, the radio frequency signal is transferred to either intermediate frequency or to a base band frequency. The down converted signal is taken to A/D-converter 504, where the signal is oversampled. The samples are further processed in calculation means 506, 550, 516 and 534. The different calculation means 506, 550, 516 and 534 of FIG. 4 can be implemented by means of one or more processors programmed by appropriate software, or in the form of hardware components, such as integrated circuits, discrete components, or a combination of any of these, which are evident to one skilled in the art.

In an embodiment, the receiver first detects the level of background noise of the receiver. The receiver may detect the level of background noise based on the thermal noise of the receiver, for example. A covariance estimation block 506 receives signals from the A/D-converter 504 and estimates an initial noise and interference covariance matrix R on the basis of the receiver signal. The noise and interference covariance matrix R provides a representation of the correlation between the received signals. The estimation means 550 receive the initial noise and interference covariance matrix R from the covariance estimation block 506, and reduces the impact of the detected background noise from the initial noise and interference covariance matrix for obtaining a residual matrix. The obtained residual matrix is accepted for further processing if the residual matrix is at least approximately positive semidefinite. If the obtained residual matrix is not at least approximately positive semidefinite, the residual matrix is modified such that the positive semidefinity of the residual matrix is achieved. Finally, for estimating a final noise and interference covariance matrix the impact of background noise is added back to the accepted residual matrix.

Let us examine the theoretical background of the disclosed solution. The received signal under Gaussian noise can be written as:

$$p(y|x, H) = \frac{1}{\pi \det(R)^n} etr(-R^{-1}Y) \quad (8)$$

where $Y=(y-Hx)(y-Hx)^H$, H is a channel matrix defining an impulse response, and x is a vector of received data symbols. Now by setting $R^{-1}=S$, a convex problem can be attained and a maximum likelihood (ML) estimate is obtained from:

$$n \log(det(S)) - ntr(SY) = 0 \quad (9)$$

It can be seen that the optimum unconstrained interference covariance estimate is the sample interference estimate $R=Y$. The above solution still suffers from sensitivity and other performance losses due to noisy covariance matrix estimate.

In an embodiment, an improved solution utilizes a priori information regarding the background noise. The level of the background noise is approximately known in the receivers or it can be estimated. A noise and interference covariance matrix can be expressed as:

$$R = \sigma^2 I + R_I \quad (10)$$

where $\sigma^2 I$ describes the background noise and the level of $\sigma^2$ is known. Matrix $R_I$ is contributed by the interference. The covariance matrix is positive semidefinite by definition, i.e., $R_I \geq 0$. As an optimisation solution, the closest allowed covariance matrix to the sample covariance matrix (the optimum unconstrained matrix) can be determined. The problem can be formulated as a cost function:

$$J(R_I, \Omega) = \|Y - \sigma^2 I + R_I\|_F^2 - tr(\Omega R_I + R_I^H \Omega^H) \quad (11)$$

where $\Omega$ is a Lagrange multiplier and $R_I^H \Omega^H$ is a requirement that the matrix $R_I$ is positive semidefinite by definition, i.e., $R_I \geq 0$. In an embodiment, Karush-Kuhn-Tucker (KKT) conditions can be applied to the above problem. In the KKT theorem, it is assumed that functions f and $g_i$ for $i=1, 2, \ldots, k$ from $R^n$ to R are differentiable, the closure of Df(x) is assumed to be Dg(x), and x is assumed to be an optimal solution to the problem. The Karush-Kuhn-Tucker (KKT) conditions for the above problem are established as:

$$\begin{cases} -Y + \sigma^2 I + R_I - \Omega = 0 \\ tr(\Omega R_I) = 0 \\ \Omega \geq 0 \end{cases} \quad (12)$$

Next, a solution that fulfils the above conditions (11) is sought. The eigendecomposition of the sample covariance matrix is given by $Y = U\Lambda_Y U^H$. Similar decompositions are also tried for $R_I = U\Lambda_R U^H$ and $\Omega = U\Lambda_\Omega U^H$. The following result is obtained:

$$\begin{cases} -\Lambda_Y + \sigma^2 I + \Lambda_R - \Lambda_\Omega = 0 \\ tr(\Lambda_\Omega \Lambda_R) = 0 \\ \Lambda_\Omega \geq 0 \end{cases} \quad (13)$$

Typically the inverse of R is wanted and thus, the eigenvalues of matrix $R^{-1}$ are obtained as:

$$\lambda_{R^{-1},j} = 1/(\max(0, \lambda_{Y,j} - \sigma^2) + \sigma^2) \quad (14)$$

Thus, when calculating eigenvalues of matrix $R^{-1}$ and negative diagonal values are encountered, they are changed to zero. In equation (14), the noise term $\sigma^2$ has been inserted.

As a conclusion a solution is found:

$$R^{-1} = U\Lambda_{R^{-1}} U^H \quad (15)$$

The above embodiment required a calculation of eigendecomposition. On the other hand, the complexity was reduced as the inverse of the interference covariance matrix (which is typically required) was obtained simultaneously.

In another embodiment, a more straightforward solution can be obtained without the calculation of the eigendecomposition. Next, a simple method is proposed. First, a covariance matrix estimate is calculated as $Y_M = Y - \sigma^2 I$. Next, the requirement of the previous section required all the eigenvalues of $Y_M$ to be positive or zero. The alternative calculation method of this embodiment is based on Gerschgorin's discs, i.e. the eigenvalues are located on discs centered by the diagonal values and having a radius of a sum of absolute values of off-diagonal row elements. Let us assume a matrix A and around every element $a_{ii}$ on the diagonal of the matrix a circle is drawn with the radius of the sum of the absolute values of the other elements on the same row $\Sigma_{j \neq i} |a_{ij}|$. Such circles are called Gershgorin's discs. Based on the Gershgorin's disc theorem, every eigenvalue of matrix A lies in one of these Gershgorin's discs. Since the eigenvalues of A and A transpose are the same, an additional set of discs having the same centers $a_{ii}$ but a radius calculated by the column $\Sigma_{j \neq i} |a_{ji}|$ can be found. In each of these circles there must be an eigenvalue. Hence, by comparing the row and column discs, the eigenvalues may be located efficiently.

Now we can set up a function for each row of $Y_M$ to obtain the rows of $R_I$:

$$r_{I,j} = f(y_{M,i}) \quad (16)$$

Next, the required interference covariance matrix can be obtained from equation (10). The original row is modified as little as possible to guarantee the positive semidefinity of the required matrix.

Figure 5:
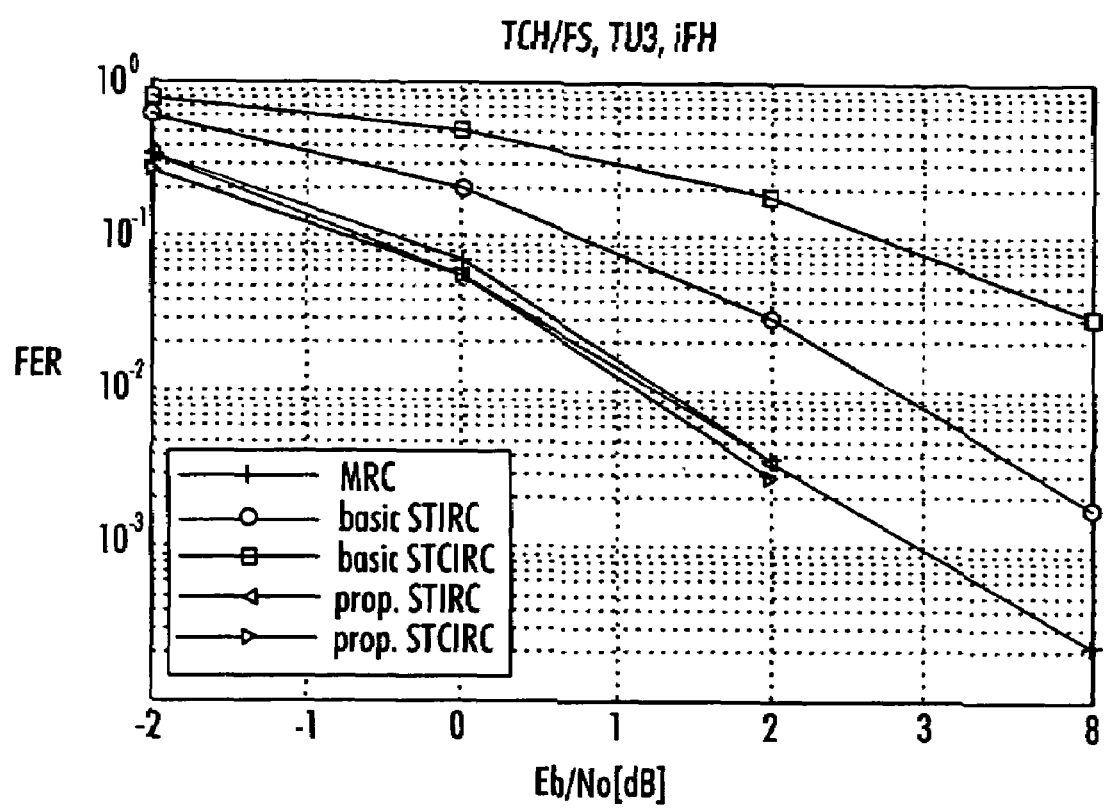
FIG. 5 illustrates simulation results of the performance of IRC receivers in various channel conditions.

FIG. 5 illustrates simulation results of the performance of IRC receivers. FIG. 5 shows simulation results of simulations carried out in TUiFH (Typical Urban, ideal frequency hopping) channel conditions using various interference and noise levels and both known (MRC, basic STRIRC, basic STCIRC) and proposed methods (prop. STIRC, prop. STCIRC). The x-axis represents the signal-to-noise ratio (Eb/No) in dB, and the y-axis represents the frame error rate (FER) or block error rate (BLER). The performance of IRC receivers was simulated against noise.

Next, TCH/FS is considered in the case of sensitivity. From the results shown in FIG. 5, it can be determined that the basic IRC methods have significant sensitivity loss and it has to be reduced somehow. Further, the STCIRC algorithm, which gave the best performance against interference is suffering the most from sensitivity loss as expected. It can be seen that the embodiment of the invention works well and the MRC performance is achieved and even slightly exceeded. It can be noted that the gain achieved with the STCIRC is surprisingly good and the proposed method makes it possible to consider using the algorithms in GSM/EDGE base station receivers, for example.

The proposed method provides the best performance with both STIRC and STCIRC algorithms. Further, the STCIRC models the interference more accurately and can therefore provide better gain against interference compared to STIRC. Also because of the same reason in the sensitivity case, STCIRC suffered from a larger loss. With the proposed solution, this loss can be removed and STCIRC seems to provide the best results in all operating conditions. Thus, the more the interference models are fine tuned and the better the IRC receivers get, the more there is a need to improve the noise plus interference matrix modelling.

As a conclusion, the proposed improved interference covariance matrix gave the best performance in all simulated conditions against noise and in the cases with noise together with interference. Especially the sensitivity gain achieved with the STCIRC algorithm was surprisingly good and the proposed solution enables the possibility of considering using the STCIRC in the GSM/EDGE systems. The proposed solution can also easily be implemented as the required matrix sizes are small in current applications used in radio systems.

Figure 6:
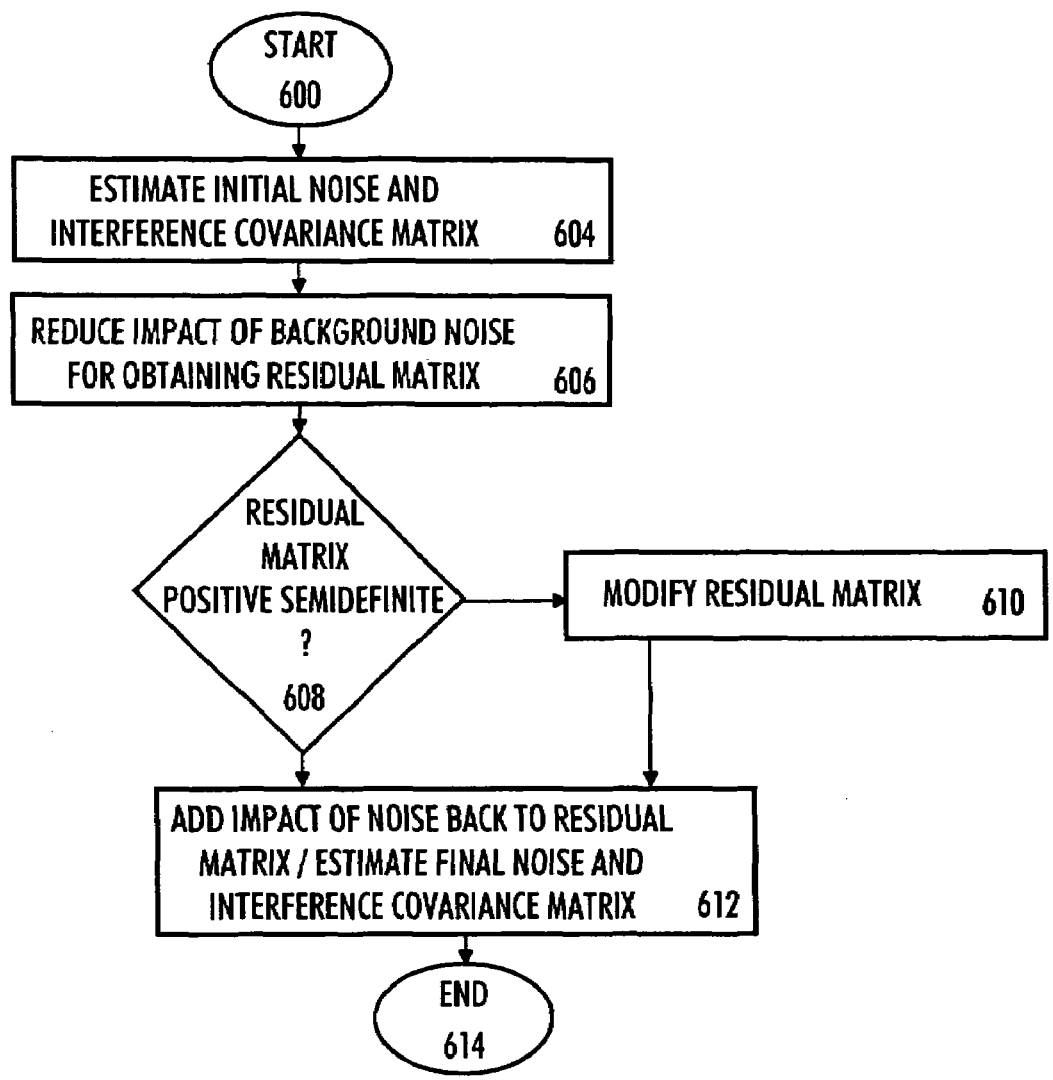
FIG. 6 illustrates en example of the method of estimating an interference covariance matrix in a receiver.

Finally, FIG. 6 illustrates an example of the method of estimating an interference covariance matrix in a receiver. The method starts in 600. In 604, an initial noise and interference covariance matrix is estimated. In 606, the impact of the background noise is reduced from the initial noise and interference covariance matrix for obtaining a residual matrix. In 608, it is detected whether the residual matrix is at least approximately positive semidefinite. Thus, the residual matrix does not have to be exactly positive semidefinite for the method to operate. It is sufficient that an approximate positive semidefinity is achieved. If, in 608, it is detected that the residual matrix is at least approximately positive semidefinite, then 612 is entered where the impact of the background noise is added back to the residual matrix and the final noise and interference covariance matrix is estimated based on the residual matrix. If, in 608, it is detected that the residual matrix is not at least approximately positive semidefinite, then 610 is entered where the obtained residual matrix is modified such that the positive semidefinity of the residual matrix is achieved. The method ends in 614.

In an aspect, the invention provides a computer program product encoding a computer program of instructions for executing a computer process.

In another aspect, the invention provides a computer program distribution medium readable by a computer and encoding a computer program of instructions for executing a computer process.

The distribution medium may include a computer readable medium, a program storage medium, a record medium, a computer readable memory, a computer readable software distribution package, a computer readable signal, a computer readable telecommunications signal, and/or a computer readable compressed software package.

Embodiments of the computer process are shown and described in conjunction with FIG. 6. The computer program may be executed in the digital signal processor of the receiver.

Even though the invention is described above with reference to an example according to the accompanying drawings, it is clear that the invention is not restricted thereto but it can be modified in several ways within the scope of the appended claims.

The invention claimed is:

1. A method, comprising:
   estimating, by a processor, an initial noise and interference covariance matrix on the basis of a received signal;
   reducing, by the processor, an impact of background noise of a receiver from the initial noise and interference covariance matrix to obtain a residual matrix;
   accepting, by the processor, the obtained residual matrix when the obtained residual matrix is at least positive semidefinite;
   modifying, by the processor, the obtained residual matrix such that a positive semidefinity of the obtained residual matrix is achieved when the obtained residual matrix is not at least positive semidefinite; and
   adding, by the processor, the impact of background noise back to the obtained residual matrix to estimate a final noise and interference covariance matrix.

2. The method of claim 1, further comprising:
   estimating, by the processor, the initial noise and interference covariance matrix on the basis of interference estimates of samples of the received signal.

3. The method of claim 1, further comprising:
   combining, by the processor, the received signal using space-time interference rejection combining; and
   controlling, by the processor, the combining of the received signal on the basis of the final noise and interference matrix.

4. The method of claim 1, further comprising:
   estimating, by the processor, the final noise and interference covariance matrix by defining the closest allowed covariance matrix to the obtained residual matrix.

5. The method of claim 1, further comprising:
   estimating, by the processor, the final noise and interference covariance matrix by using a Karush-Kuhn-Tucker theorem.

6. The method of claim 5, wherein the estimating the final noise and interference covariance matrix further comprises calculating, by the processor, eigendecomposition of the obtained residual matrix.

7. The method of claim 5, wherein the estimating the final noise and interference covariance matrix further comprises calculating, by the processor, eigenvalues of a inverse of the obtained residual matrix.

8. The method of claim 1, further comprising:
   estimating, by the processor, the final noise and interference covariance matrix based on Gerschgorin's discs theorem.

9. An apparatus, comprising:
   means for estimating an initial noise and interference covariance matrix on the basis of a received signal;
   means for reducing an impact of background noise of the apparatus from the initial noise and interference covariance matrix for obtaining a residual matrix;
   means for accepting the obtained residual matrix when the obtained residual matrix is at least positive semidefinite;
   means for modifying the obtained residual matrix such that a positive semidefinity of the obtained residual matrix is achieved when the obtained residual matrix is not at least positive semidefinite; and
   means for adding the impact of background noise back to the obtained residual matrix for estimating a final noise and interference covariance matrix.

10. The apparatus of claim 9, further comprising:
    means for combining the received signal using space-time interference rejection combining; and
    means for controlling the combining of the received signal on the basis of the final noise and interference matrix.

11. The apparatus of claim 9, further comprising:
    means for estimating the final noise and interference covariance matrix by defining the closest allowed covariance matrix to the obtained residual matrix.

12. The apparatus of claim 9, further comprising:
    means for estimating the final noise and interference covariance matrix by using a Karush-Kuhn-Tucker theorem.

13. The apparatus of claim 12, further comprising:
means for estimating the final noise and interference covariance matrix by calculating eigendecomposition of the obtained residual matrix.

14. The apparatus of claim 9, further comprising:
means for estimating the final noise and interference covariance matrix based on Gerschgorin's discs theorem.

15. An apparatus, comprising:
a processor; and
a memory including computer program code,
wherein the memory and the computer program code are configured to, with the processor, cause the apparatus at least to perform
estimating an initial noise and interference covariance matrix on the basis of a received signal,
reducing an impact of the background noise of the apparatus from the initial noise and interference covariance matrix to obtain a residual matrix,
accepting the obtained residual matrix when the obtained residual matrix is at least positive semidefinite,
modifying the obtained residual matrix such that a positive semidefinity of the obtained residual matrix is achieved when the obtained residual matrix is not at least positive semidefinite, and
adding the impact of background noise back to the obtained residual matrix to estimate a final noise and interference covariance matrix.

16. The apparatus of claim 15, wherein the processor is configured to combine the received signal using space-time interference rejection combining and to control the combining of the received signal on the basis of the final noise and interference matrix.

17. A system, comprising:
a receiver configured to communicate signals between the network infrastructure and the user equipment, the receiver further comprising a processor configured
to estimate an initial noise and interference covariance matrix on the basis of a received signal,
to reduce an impact of background noise of the receiver from the initial noise and interference covariance matrix for obtaining a residual matrix,
to accept the obtained residual matrix when the obtained residual matrix is at least positive semidefinite,
to modify the obtained residual matrix such that a positive semidefinity of the obtained residual matrix is achieved when the obtained residual matrix is not at least positive semidefinite, and
to add the impact of background noise back to the obtained residual matrix to estimate a final noise and interference covariance matrix.

18. The system of claim 17, wherein the processor is configured to combine the received signal using space-time interference rejection combining and to control the combining of the received signal on the basis of the final noise and interference matrix.

19. The system of claim 17, wherein the processor is configured to estimate the final noise and interference covariance matrix by defining the closest allowed covariance matrix to the obtained residual matrix.

20. The system of claim 17, wherein the processor is configured to estimate the final noise and interference covariance matrix by using a Karush-Kuhn-Tucker theorem.

21. The system of claim 20, wherein the processor is configured to estimate the final noise and interference covariance matrix by calculating eigendecomposition of the obtained residual matrix.

22. The system of claim 17, wherein the processor is configured to estimate the final noise and interference covariance matrix based on Gerschgorin's discs theorem.

23. A system, comprising:
a network infrastructure;
user equipment; and
a receiver configured to communicate signals between the network infrastructure and the user equipment, the receiver further comprising a processor configured
to estimate an initial noise and interference covariance matrix on the basis of a received signal,
to reduce an impact of background noise of the receiver from the initial noise and interference covariance matrix to obtain a residual matrix,
to accept the obtained residual matrix when the obtained residual matrix is at least positive semidefinite,
to modify the obtained residual matrix such that a positive semidefinity of the obtained residual matrix is achieved when the obtained residual matrix is not at least positive semidefinite, and
to add the impact of background noise back to the obtained residual matrix to estimate a final noise and interference covariance matrix.

24. A computer-readable storage medium encoded with instructions configured to control a computer to perform a process, the process comprising:
estimating an initial noise and interference covariance matrix on the basis of a received signal;
reducing an impact of background noise of the receiver from the initial noise and interference covariance matrix to obtain a residual matrix;
accepting the obtained residual matrix when the obtained residual matrix is at least positive semidefinite;
modifying the obtained residual matrix such that a positive semidefinity of the obtained residual matrix is achieved when the obtained residual matrix is not at least positive semidefinite; and
adding the impact of background noise back to the obtained residual matrix to estimate a final noise and interference covariance matrix.

25. The computer-readable storage medium of claim 24, the process further comprising:
estimating the initial noise and interference covariance matrix on the basis of interference estimates of samples of the received signal.

* * * * *